May 10, 1932. M. DE FRANCISCO 1,857,441
COLOR PROJECTING MACHINE
Filed Sept. 30, 1927
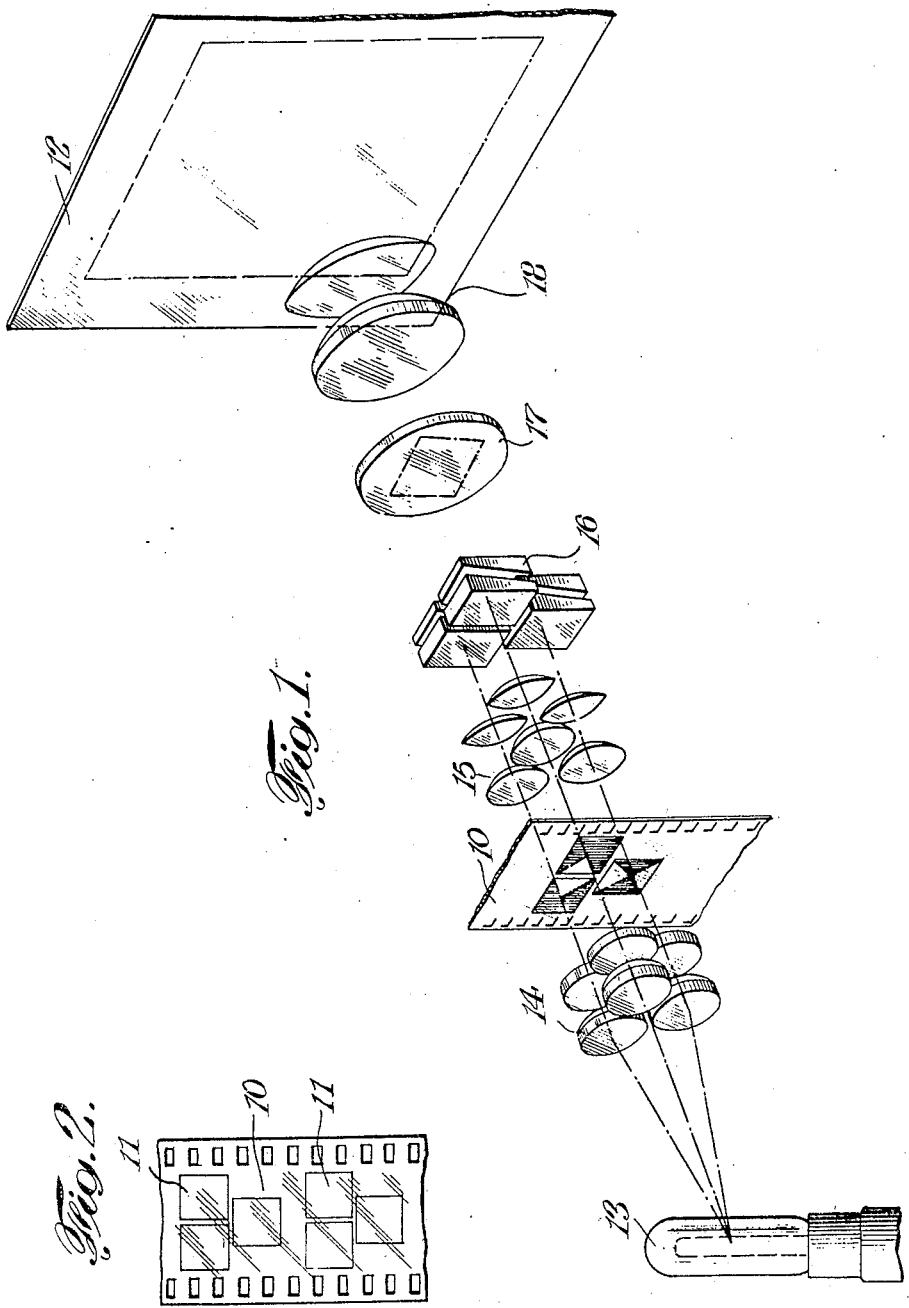
Inventor
Marshall De Francisco
By his Attorneys
Hoguet and Neary Patented May 10, 1932

1,857,441

UNITED STATES PATENT OFFICE

MARSHALL DE FRANCISCO, OF NEW YORK, N. Y.

COLOR PROJECTING MACHINE

Application filed September 30, 1927. Serial No. 223,008.

This invention appertains to improvements in color photography and more particularly relates to a novel machine and method for projecting color pictures upon the screen.

In my pending application for patent, Serial No. 201,067 filed June 24, 1927, I have disclosed a machine and method for producing on an image fixing medium such as a film a plurality of unicolored images corresponding in shape and configuration to the photographed object or objects but comprising only that portion of the photographed object or objects having the color value corresponding to a predetermined color value of the image. The number of the unicolored images may vary and so may the color values selected therefor, these being purely matters of choice. In the present application, I am concerned with a machine and method of projecting the plurality of unicolored images in superposition and coincidence upon the screen whereby by such projection a multicolored picture corresponding in shape, configuration, and color to the original photographed object or objects is obtained.

The present invention therefor primarily aims to provide a machine and method of projecting the unicolored images from the image-fixing medium or film upon the screen in such a way that the resulting picture corresponds accurately in shape, configuration and color to the photographed object or objects. The difficulty of such projection will be readily appreciated and a satisfactory apparatus and method for doing so has never hitherto been devised. According to my invention, the plurality of unicolored images on the image fixing medium are first projected in coincidence and superposition and reproduced as a multicolored image on a transparent or light-permeable auxiliary screen. The auxiliary screen is interposed between the main screen and the image-fixing medium and the multicolored image reproduced on said auxiliary screen is transferred therefrom and reproduced and projected upon the main screen. This auxiliary screen is placed very close to the image fixing medium and consequently the multicolored image produced thereon by the projection of the unicolored images of the image fixing medium in superposition, may be a very accurate simulation of the original photographed object both in shape, configuration, and in color, which could not obtain were the unicolored images directly projected upon the main screen owing to the distance that the latter is situated from the image-fixing medium containing the unicolored images.

A further desirable feature of the invention resides in the fact that the multicolored image may be produced on a screen arranged at any distance from the projecting machine and it is not essential that the screen be fixed at a certain definite distance therefrom.

Other objects and desirable features of the invention will become apparent as the description of the accompanying drawings proceeds.

In the drawings:

Figure 1 is a perspective schematic view showing diagrammatically the combination of elements comprising a device constructed in accordance with the present invention; and Figure 2 is a view of an image-fixing medium indicated as a motion picture film showing the unicolored images arranged thereon.

This invention is susceptible of use generally in the field of photography and may be employed in conjunction both with "still" and "motion" pictures. Any desired or suitable number of unicolored images may be employed in the practise of the invention and the colors elected for such images is of course a matter of choice. The number of such images for most practical purposes will not exceed three or four and it is well known that certain colors will function with better results than others.

The numeral 10 indicates a motion picture film or other image fixing medium having thereon a plurality of unicolored images 11 corresponding in shape and configuration to the original photographed object or objects with each image comprising a single color value and containing only that portion of the photographed object having that color, the color values of the various unicolored images varying so that when they are projected in superposition and coincidence upon the screen a multicolored image is obtained thereby which accurately simulates the original object or objects in shape, configuration and color. The plurality of unicolored images located upon the image-fixing medium 10 are projected in superposition and coincidence upon the main screen 12 and to this end I may employ an electric illuminating light or bulb 13 or other illuminating means adapted to supply the light necessary for projecting purposes. The light from the bulb 13 is concentrated upon the images by means of lenses 14 each of which is preferably colored to conform to the unicolored image on the image fixing medium or film with which it is used. The surfaces of the lenses located next to the images are preferably finely ground so that the light striking the images is very intense.

The light passing through the images on the film also passes through another set of lenses 15 and through a system of prisms 16 onto an auxiliary screen 17 where by reason of the prisms the unicolored images are projected in coincidence and superposition with great exactness and nicety so that the image obtained corresponds with great accuracy to the original photographed object in shape, configuration and also in color. The auxiliary screen 17 is made of light-permeable material, preferably highly transparent glass, so that it does not dim or diminish the intensity of the picture obtained on the main screen 12 and projected thereon from the multicolored image on the screen 17. It will be understood that the rays of light after striking the transparent screen 17 straighten out into substantial parallelism and exit from said screen in such manner. Between the auxiliary screen and the main screen I preferably interpose another lens 18 of considerable size which may be adjusted and which serves to focus the image from the screen 17 upon the main screen 12.

In the actual practice of the invention, all the elements described with the exception of course of the main screen 12 are mounted and disposed in a unitary apparatus and these elements are arranged very close to one another and preferably in a compact fashion and by reason of the compactness, the accuracy of construction of the various elements and the nicety with which the parts are adjusted, the image which is produced upon the screen 17 by the superposition of the plurality of the unicolored images is an excellent simulation of the original photographed object in all respects. It will be seen further that by the provision and use of the screen 17 in conjunction with the adjustable lens 18 a picture may be produced on the main screen situated at different distances from the machine and it is possible to focus such a picture on the main screen properly. A valuable feature of the invention resides in the fact that the light rays striking the unicolored images and passing therethrough are very intense and consequently the picture obtained is clear and bright.

In place of using colored glass for the lenses 14, I may if desired use clear glass and light filters of various natures but I find that colored glass lenses appear best suited for the purpose. When the projecting apparatus is originally assembled and constructed, the positions of the auxiliary screen and the other elements are determined with nicety and accuracy and it is not necessary afterwards to change such positions.

Having thus described my invention what I claim as new and desire to secure by Letters Patent is:

1. A device of the class described, comprising, in combination with a main screen, an image fixing medium having a plurality of unicolored images thereon, an auxiliary screen located between the main screen and the image fixing medium, a plurality of prisms between the image-fixing medium and auxiliary screen whereby the unicolored images are projected on the auxiliary screen in superposition and coincidence without substantial distortion, and an adjustable lens between the auxiliary screen and main screen.

2. A device of the class described comprising, in combination with a main screen, an image fixing medium having a plurality of the unicolored images thereon, an auxiliary screen between the main screen and image fixing medium and located at a fixed distance therefor, said auxiliary screen being composed of light-permeable material, means for projecting the plurality of unicolored images in superposition and coincidence upon the auxiliary screen without substantial distortion, said means including a light, a plurality of colored lenses between the light and the image fixing medium and a plurality of prisms between the image fixing medium and the auxiliary screen, and means for reproducing the image on the auxiliary screen upon the main screen.

3. In a device for projecting colored pictures upon a main screen, said device comprising the combination of an auxiliary screen, a source of light adapted to transmit light rays through a medium carrying a plurality of color value images, optical means comprising prisms between said medium and said auxiliary screen to focus the light rays of said images upon said auxiliary screen in overlapping relation to produce thereon a single composite image of the color values of the plurality of images, and an adjustable lens adapted to project the superimposed images from the auxiliary screen to the main screen.

4. A projecting device for projecting colored pictures upon a main screen comprising in combination a transparent auxiliary screen; a source of light adapted to transmit light rays through a medium having thereon a plurality of color value images of a single scene; means for projecting the color value images on said medium upon said auxiliary screen in superposition and coincidence to comprise a single multi-colored picture, said means comprising transparent colored members and a plurality of prisms; and focusing means for projecting the image from the auxiliary screen upon the main screen.

5. In a projecting device for projecting colored pictures upon a main screen from a light transmitting image carrying medium having thereon a plurality of coincident images of different color values; the combination of a source of light adapted to transmit rays through the images on said medium; an auxiliary screen; means to focus the light rays through said images upon said auxiliary screen in such manner as to synthesize said plurality of images into a single image having therein the color values of all of said plurality of images, said means comprising a lens system and a prism for each image on the image carrying medium; and means to project upon a main screen the synthesized image from said auxiliary screen.

In testimony whereof, I have signed my name to this specification this 29th day of September, 1927.

MARSHALL DE FRANCISCO.